US005814402A

United States Patent [19]

Smith

[11] Patent Number: 5,814,402

[45] Date of Patent: Sep. 29, 1998

[54] PRESSURE SENSITIVE DRY TRANSFER GRAPHICS ARTICLE AND METHOD OF MANUFACTURE

[75] Inventor: John Ralph Smith, Gansevoort, N.Y.

[73] Assignee: Decora Incorporated, Fort Edward, N.Y.

[21] Appl. No.: 50,511

[22] Filed: Apr. 20, 1993

[51] Int. Cl.[6] .................... B32B 7/12

[52] U.S. Cl. .................... 428/354; 428/207; 428/914; 156/240; 427/207.1

[58] Field of Search .................... 428/195, 202, 428/204, 207, 343, 352, 354, 355, 914; 156/239, 240, 277; 427/207.1, 208.4

[56] References Cited

U.S. PATENT DOCUMENTS

| | | | |
|---|---|---|---|
| 4,028,165 | 6/1977 | Rosenfeld | 156/234 |
| 4,056,661 | 11/1977 | Sato et al. . | |
| 4,111,734 | 9/1978 | Rosenfeld | 156/234 |
| 4,308,310 | 12/1981 | Arnold et al. | 428/195 |
| 4,337,107 | 6/1982 | Eshleman . | |
| 4,421,816 | 12/1983 | Arnold . | |
| 4,454,179 | 6/1984 | Bennett et al. | 428/41 |
| 4,517,044 | 5/1985 | Arnold | 428/352 X |
| 4,640,727 | 2/1987 | Janssen | 428/345 X |
| 4,759,968 | 7/1988 | Janssen | 428/354 X |
| 4,855,171 | 8/1989 | McKie et al. . | |
| 4,919,994 | 4/1990 | Incremona et al. | 428/354 X |
| 4,999,076 | 3/1991 | Incremona et al. | 156/241 |
| 5,141,789 | 8/1992 | Matsuzawa et al. . | |

FOREIGN PATENT DOCUMENTS

| | | |
|---|---|---|
| 934614 | 10/1973 | Canada . |

*Primary Examiner*—Daniel Zirker
*Attorney, Agent, or Firm*—Hedman, Gibson, Costigan, P.C.

[57] ABSTRACT

A pressure sensitive dry transfer article comprising a backing film, a release coating applied to a first face of the backing film, a continuous film of brittle polymeric compound applied to the release coating, and a pigmented pressure sensitive adhesive coating applied in imagewise fashion to said polymeric film to form a graphic pattern. On application of the article to the bonding substrate by pressure applied to the areas defined by the graphic pattern, the pigmented pressure sensitive adhesive is transferred to the bonding substrate and, after peeling the article away from the bonding substrate, the polymeric film fractures along the borders defining the graphic pattern such that the polymeric film in union with the graphic pattern is transferred with the pressure sensitive adhesive to the bonding substrate and the polymeric film not in union with the graphic pattern remains with the release coating.

16 Claims, 2 Drawing Sheets

PRESSURE SENSITIVE DRY TRANSFER GRAPHICS ARTICLE AND METHOD OF MANUFACTURE

FIELD OF THE INVENTION

This invention relates to a pressure sensitive dry transfer article and a method of manufacture of such article.

BACKGROUND OF THE INVENTION

There are many applications for a high strength, well protected, strongly adherent dry transfer article, or label. Such labels are traditionally made by printing inks onto a self-adhesive base film and then overlaminating the printed matter with a further layer of clear film to cover and protect the printed inks from abrasion and weathering.

Traditional materials for the base film or substrate are transparent or pigmented vinyl or polyester, and various types of natural or synthetic papers. The appropriate substrate is chosen to give the desired properties of color, opacity, elasticity, tensile strength, etc.

The over laminating material is, of necessity, clear and transparent and may have a gloss or matt surface. The associated adhesive for affixing the protective overlaminating layer must be compatible with the previously printed inks and the base layer.

The overlaminate may be applied by several different methods; e.g., (1) hot laminating using an adhesive that melts upon the application of heat; (2) cold laminating using a pressure sensitive adhesive; and (3) solvent based adhesive where the adhesive is applied as a solution and its associated solvent must be driven off prior to bonding. Other methods have also been utilized.

The known methods for manufacturing such dry transfer articles are costly and time consuming. Also, since the overlaminate applied to the ink and backing layers is continuous, the dry transfer articles must be die cut from the continuous sheets before final use. This involves the added expense of costly dies and cutting equipment, particularly when the article has a complex shape.

There are many other different types of labels or dry transfer articles produced by various processes. One common process requires printing successive layers of inks onto a release coated paper stock and finally applying an adhesive. Such labels are normally printed with nitrocellulose ink systems and do not approach the strength of the laminated articles. Labels of such construction also suffer from another major disadvantage. They are printed onto a paper based substrate and they are printed by screen process. Paper substrates are heavy and generally opaque. Still the heavy substrate is necessary to allow the sheet to be printed with many layers needed to build up the strength of the label by applying many coats of clear lacquer as well as all the colors needed to achieve the graphic design.

The opacity of the substrate makes it impossible to accurately align these articles and place them precisely. Further, when such articles use a high tack adhesives, the adhesive bonds immediately upon contact and no repositioning of the articles is possible. This is particularly true with respect to the printed articles which do not have sufficient tensile strength to allow peeling and replacement.

Arnold et al., U.S. Pat. No. 4,308,310, discloses a dry transfer article including a flexible substrate layer, a high adhesion urethane film, ink layers printed on the urethane film, and a high tack adhesive screened only over the printed layers. By applying local pressure through the substrate on the dry transfer article, the article is transferred to a surface and the substrate layer peels off. This dry transfer article is disadvantageous since the urethane film, the ink layers, and the high tack adhesive must be screened or printed to the substrate in the shape of the desired indicia and in alignment with each other in order to properly form the article. It is difficult and costly to achieve satisfactory alignment of adhesive and graphics, especially for intricate patterns of indicia.

Canadian Patent No. 934,614 discloses a dry transfer material comprising a carrier sheet including a solvent-inert, substantially non-extensible highly cross-linked polymeric surface on which indicia which form a film are printed. A dry elastomeric pressure sensitive adhesive extends over the indicia. Upon application of the article to a bonding substrate, since the indicia is relatively lightly adhered to the polymeric coating as compared to the adherence of the adhesive to the coating, the indicia may be readily pulled from the polymeric coating by the adherence of the adhesive to the substrate.

Bennett et al., U.S. Pat. No. 4,454,179 discloses a dry transfer article comprising a carrier film bearing a graphic indicia in the form of one or more layers of ink and an actinic responsive adhesive overlapping the design, wherein the ink serves as a mask to actinic radiation such that only adhesive in non-ink areas is exposed to radiation, creating thereby a differential adhesive tack which allows the article to be positioned on the substrate and the carrier film and exposed adhesive to be selectively removed leaving the graphic design and underlying unexposed adhesive bonded to the substrate. That is, the adhesive layer cleaves at the borders of the indicia such that the adhesive in contact with the indicia will adhere the indicia to the substrate and the remaining adhesive is peeled off with the carrier film.

Similarly, Incremons et al., U.S. Pat. No. 4,999,076 discloses a method for preparing a dry transfer article comprising coating a release liner with an adhesive layer, applying a layer of imaging material to provide a graphic design, and contacting the graphic pattern and the exposed surface of the adhesive with a carrier film having a high compatibility with the adhesive and low compatibility with the graphic pattern. As such, after pressure is exerted over the article onto a bonding substrate, the adhesive in contact with the image pattern material adheres the pattern to the bonding substrate, and the adhesive layer near the border of the image pattern fractures so that the adhesive layer not in contact with the image material remains adhered to the carrier film and peels away therewith.

Rosenfeld, U.S. Pat. No. 4,028,165 and U.S. Pat. No. 4,111,734 discloses a dry transfer article made by printing ink on a low energy carrier to form a desired graphic pattern and overcoating the pattern and the exposed portions of the carrier with an adhesive. Application to a substrate is provided by contacting the article to the substrate. The adhesive fractures along the border of the graphic pattern such that part of the adhesive remains with the carrier and the other part transfers with the graphic pattern. Good weeding characteristics are not reliably provided, i.e., the adhesive is not completely removed from the substrate. Therefore, such articles typically require the use of low dry tack adhesives which in turn require high pressure or point pressure, i.e., 50 $lbs/in^2$ or more, to achieve graphic transfer to the substrate. Furthermore, such graphic patterns may tend to be difficult to separate from the carrier, thereby resulting in incomplete transfer to the substrate and/or spoiling of the finish of the transferred graphic pattern.

It is an object of the present invention to provide an improved pressure sensitive dry transfer graphics article for application to a bonding substrate which overcomes the aforementioned disadvantages of the prior art.

SUMMARY OF THE INVENTION

In accordance with these and other objects, provided is a pressure sensitive dry transfer graphics article for application to a bonding substrate comprising a backing film comprising a first face and a second face, a release coating applied to the first face of the backing film, a continuous film of brittle polymeric compound applied to the release coating, and a pigmented pressure sensitive adhesive coating applied in imagewise fashion to the polymeric film to form a graphic pattern. In accordance with the present invention, upon application of the pressure sensitive dry transfer graphics article to the bonding substrate by pressure applied to the areas defined by the graphic pattern, the pigmented pressure sensitive adhesive is transferred to the bonding substrate and, after peeling the article away from the bonding substrate, the polymeric film fractures along the borders defining the graphic pattern such that the polymeric film in union with the graphic pattern is transferred with the pressure sensitive adhesive to the bonding substrate and the polymeric film not in union with the graphic pattern remains with the release coating.

The method for preparing the pressure sensitive dry transfer graphics article of the present invention comprises the steps of applying, to a backing film comprising a first face and a second face, a release coating to the first face, applying to the release coating a continuous film of brittle polymeric compound applying in imagewise fashion to the polymeric film a pigmented pressure sensitive adhesive coating to form a graphic pattern, and curing the article thus formed.

In accordance with an alternative embodiment of the present invention, provided is a pressure sensitive dry transfer graphics article for application to a bonding substrate comprising a backing film comprising a first face and a second face, a release coating applied to the first face of the backing film, a continuous film of brittle polymeric compound applied to the release coating, a layer of ink applied in imagewise fashion to the polymeric film to form a graphic pattern; and a clear or pigmented pressure sensitive adhesive coating applied in imagewise fashion to the layer of ink, the pressure sensitive adhesive coating being approximately the same graphic pattern as the layer of ink and being in approximate registration therewith.

In accordance with another alternative embodiment of the present invention, provided is a pressure sensitive dry transfer graphics article for application to a bonding substrate comprising a backing film comprising a first face and a second face, a continuous film of brittle polymeric compound applied to the first face of the backing film, and a pigmented pressure sensitive adhesive coating applied in imagewise fashion to the polymeric film to form a graphic pattern. The backing film comprises a non-bonding substrate and the brittle polymeric compound comprises a lubricant to supply release properties, thus making unnecessary the separate release coating. Upon application of the pressure sensitive dry transfer graphics article to the bonding substrate by pressure applied to the areas defined by the graphic pattern, the pigmented pressure sensitive adhesive is transferred to the bonding substrate and, after peeling the article away from the bonding substrate, the polymeric film fractures along the borders defining the graphic pattern such that the polymeric film in union with the graphic pattern is transferred with the pressure sensitive adhesive to the bonding substrate and the polymeric film not in union with the graphic pattern remains with the release coating.

DESCRIPTION OF THE PREFERRED EMBODIMENT

Figure 1:
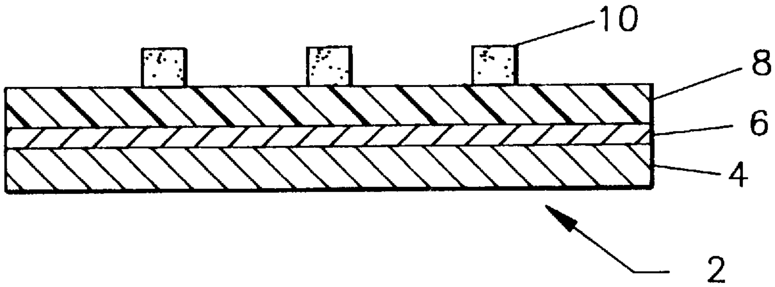
FIG. 1 is a side perspective view of a preferred embodiment of the pressure sensitive dry transfer graphics article of the present invention.

Referring to FIG. 1, the pressure sensitive dry transfer graphics article 2 comprises a backing film 4 on which a release coating 6 is applied to a first face thereof. In the preferred embodiment, the backing film 4 is kraft paper of essentially any basis weight, and has been found to be ideally in the range of 20 to 80 lbs. per 3000 $ft^2$. The release coating 6 should have properties similar to conventional silicone coated release papers, for example, Dow Corning Syloff 23 with DC 23A catalyst.

In the alternative, the backing film 4 can be a thin plastic film such as polyethylene, PET (polxathylene terephthalate) or polypropylene. In one embodiment, the dry transfer graphic article 2 can be made to be amenable to self-winding by applying an additional release coating 6 to the second face of the backing film 4, as will be further described below.

A continuous polymeric film 8 is applied to the release coating 6. Practice has taught that the polymeric film must be of adequate hardness to impart good abrasion as well as slip properties. The polymeric film 8 should be relatively brittle and have a maximum elongation of 100%. Coatings based on acrylic and/or vinyl chloride–vinyl acetate resins have demonstrated adequate properties at deposits ranging from 0.01 $oz/yd^2$ to 0.1 $oz/yd^2$ dry deposit. Higher or lower deposits will work also but the above numbers are the preferred range.

The desired design for the dry transfer article 2 is then applied by coating a layer of pigmented pressure sensitive adhesive 10 in imagewise fashion to the polymeric film 8. Practice has taught that the adhesive deposit can vary according to the degree of adhesion required as well as the type of pressure sensitive adhesive employed. Acrylic pressure sensitive adhesive, in the range of 0.1 to 0.3 $oz/yd^2$ dry deposit have heretofore given the best results in applications to a wide variety of bonding substrates. Typically useful are emulsion pressure sensitive adhesives such as those based on butyl acrylate or 2-ethyl-hexyl acrylate. These adhesives generally run about 50% total solids by weight and viscosity from 50 to 1000 cps. (#3 spindle at 60 rpm) and a plasticity from 1.5 to 3.5 mm.

After the layer of pigmented pressure sensitive adhesive 10 is applied, the article 2 is dried or cured as required.

If both sides of the backing film 4 have been provided with a release coating 6, the dry transfer article 2 can be self-wound; that is, the pigmented pressure sensitive adhesive 10 can be removably applied to the release-coated backing layer 4. If only the first face has been release coated, then an additional release liner can be used to protect the layer of pigmented pressure sensitive adhesive 10 until the article 2 is put to use.

Figure 2:
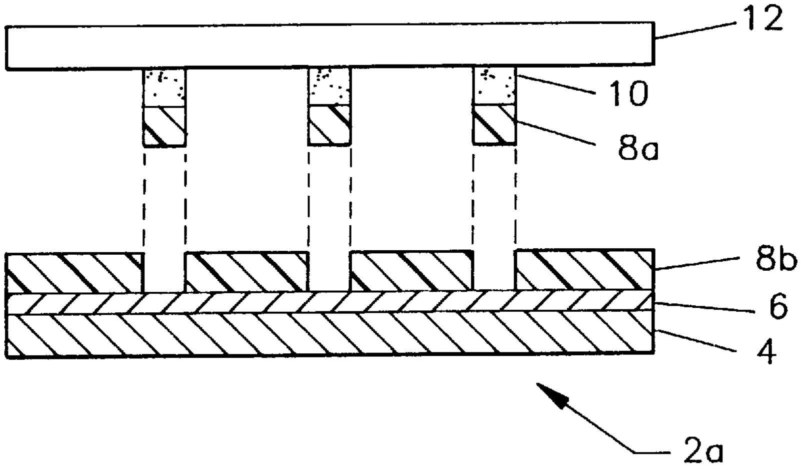
FIG. 2 is a side perspective view of the article of FIG. 1 after application to a bonding substrate.

Referring to FIG. 2, implementation of the pressure sensitive dry transfer graphics article 2 is as follows. The article 2 is positioned as desired over the bonding substrate 12, and, when aligned as desired, pressure is applied to the areas defined by the graphic pattern. The pigmented pressure sensitive adhesive 10 is transferred to the bonding substrate 12. By peeling the article 2*a* away from said bonding substrate 12, the polymeric film 8 fractures along the borders defining the graphic pattern such that the polymeric film 8*a* in union with the graphic pattern is transferred with the pigmented pressure sensitive adhesive 10 to the bonding substrate 12, and the polymeric film 8*b* not in union with the graphic pattern remains with release coating 6. The dotted lines in FIG. 2 indicate the points where the polymeric film 8 fractures into segments 8*a* and 8*b*. As a result, the desired image pattern is transferred to the bonding substrate 12 and is layered with a coating of polymeric film 8*a* only over the image pattern, and not over the non-imaged areas.

Figure 3:
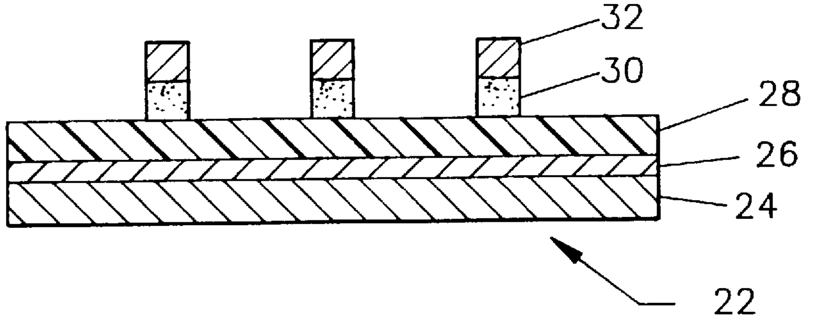
FIG. 3 is a side perspective view of an alternative embodiment of the pressure sensitive dry transfer graphics article of the present invention.
Figure 4:
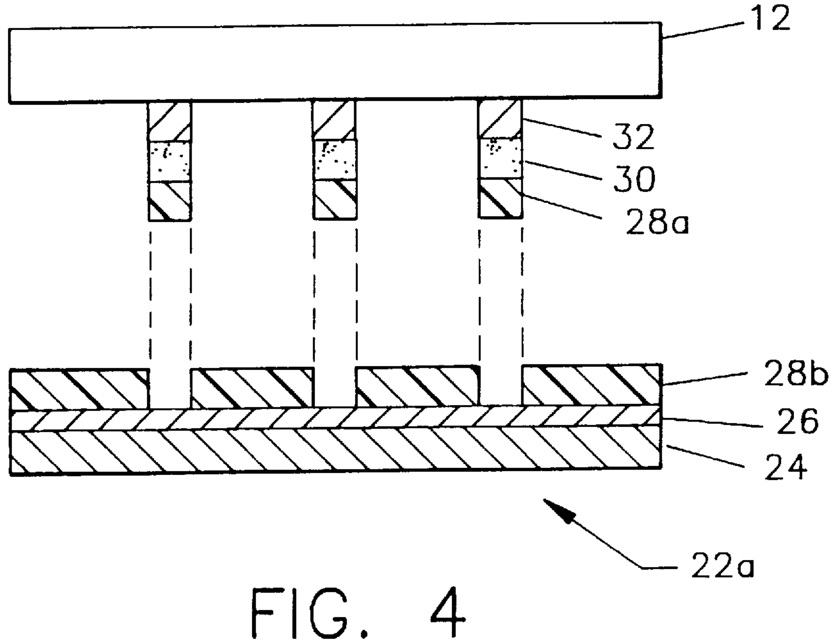
FIG. 4 is a side perspective view of the article of FIG. 3 after application to a bonding substrate.

An alternative embodiment of the present invention is shown in FIGS. 3 and 4. The pressure sensitive dry transfer graphics article 22 comprises a backing film 24 on which a release coating 26 is applied to a first face thereof. A continuous polymeric film 28 is applied to the release coating 26. The desired design for the dry transfer article 22 is then applied by coating a layer 30 of conventional ink in imagewise fashion to the polymeric film 28.

A layer 32 of clear or pigmented pressure sensitive adhesive is then applied directly to the layer 30 of ink. The pressure sensitive adhesive covers the entire printed surface in such a manner that exact registration of the adhesive to the ink is not necessary; i.e., the adhesive can overlap the printed surface as a function of a desired bordered or borderless appearance as desired. After the layer 32 of pressure sensitive adhesive is applied, the article 22 is dried or cured as required.

If both sides of the backing film 24 have been provided with a release coating 26, the dry transfer article 22 can be self-wound; that is, the pigmented pressure sensitive adhesive 32 can be removably applied to the release-coated backing layer 24. If only the first face has been release coated, then an additional release liner can be used to protect the layer of pigmented pressure sensitive adhesive 32 until the article 22 is put to use.

Referring to FIG. 4, implementation of the pressure sensitive dry transfer graphics article 22 is as follows. The article 22 is positioned as desired over the bonding substrate 12, and, when aligned as desired, pressure is applied to the areas defined by the graphic pattern. The pressure sensitive adhesive 32 is transferred to the bonding substrate 12. By peeling the article 22*a* away from said bonding substrate 12, the polymeric film 28 fractures along the borders defining the graphic pattern such that the polymeric film 28*a* in union with the graphic pattern is transferred with the pressure sensitive adhesive 32 to the bonding substrate 12, and the polymeric film 28*b* not in union with the graphic pattern remains with release coating 26. The dotted lines in FIG. 4 indicate the points where the polymeric film 28 fractures into segments 28*a* and 28*b*. As a result, the desired image pattern is transferred to the bonding substrate 12 and is layered with a coating of polymeric film 28*a* only over the image pattern, and not over the non-imaged areas.

The release coating 6 shown in FIGS. 1 and 2 and the release coating 26 shown in FIGS. 3 and 4 may optionally be omitted. That is, in the alternative, the brittle polymeric films 8 and 28 can be cast on a non-bonding substrate such as untreated polyolefins as a carrier web. Lubricants can be incorporated into the brittle polymeric compound to supply release properties.

The advantage of the release coatings is consistent release coupled with controlling the gloss of the design. However, for high gloss signage products, lubricant modified carrier webs and/or lubricant modified polymeric compounds will be used.

I claim:

1. A method for preparing a pressure sensitive dry transfer graphics article for application to a bonding substrate comprising the steps of:

a) applying, to a backing film comprising a first face and a second face, a release coating to said first face;

b) applying to said release coating a continuous film of brittle polymeric compound;

c) applying in imagewise fashion to said polymeric film a pigmented pressure sensitive adhesive coating to form a graphic pattern; and d) curing said article formed by steps (a) through (c);

whereby, upon application of said pressure sensitive dry transfer graphics article to the bonding substrate by pressure applied to the areas defined by said graphic pattern, said pigmented pressure sensitive adhesive is transferred to the bonding substrate and, after peeling said article away from said bonding substrate, said polymeric film fractures along the borders defining said graphic pattern such that the polymeric film in union with said graphic pattern is transferred with said pressure sensitive adhesive to the bonding substrate and the polymeric film not in union with said graphic pattern remains with said release coating.

2. The method of claim 1 in which a release coating is applied to said second face of said backing film so that said pressure sensitive dry transfer graphics article can be self-wound.

3. The method of claim 1 further comprising the step of applying to said pigmented pressure sensitive adhesive coating a release liner.

4. A pressure sensitive dry transfer graphics article for application to a bonding substrate comprising:

a) a backing film comprising a first face and a second face;

b) a release coating applied to said first face of said backing film;

c) a continuous film of brittle polymeric compound applied to said release coating; and d) a pigmented pressure sensitive adhesive coating applied in imagewise fashion to said polymeric film to form a graphic pattern;

whereby, upon application of said pressure sensitive dry transfer graphics article to the bonding substrate by pressure applied to the areas defined by said graphic pattern, said pigmented pressure sensitive adhesive is transferred to the bonding substrate and, after peeling said article away from said bonding substrate, said polymeric film fractures along the borders defining said graphic pattern such that the polymeric film in union with said graphic pattern is transferred with said pressure sensitive adhesive to the bonding substrate and the polymeric film not in union with said graphic pattern remains with said release coating.

5. The pressure sensitive dry transfer graphics article of claim 4 in which a release coating is applied to said second face of said backing film so that said pressure sensitive dry transfer graphics article can be self-wound.

6. The pressure sensitive dry transfer graphics article of claim 4 further comprising a release liner applied to said pigmented pressure sensitive adhesive coating.

7. The pressure sensitive dry transfer graphics article of claim 4 in which said backing film is kraft paper.

8. The pressure sensitive dry transfer graphics article of claim 7 in which said kraft paper is in the range of about 20 to about 80 pounds per 3000 square feet.

9. The pressure sensitive dry transfer graphics article of claim 4 in which said release coating is silicone coated release paper.

10. The pressure sensitive dry transfer graphics article of claim 4 in which said backing film is a plastic film.

11. The pressure sensitive dry transfer graphics article of claim 10 in which said plastic film is selected from the group consisting of, polyethylene, polyethylene terephthalate polypropylene.

12. The pressure sensitive dry transfer graphics article of claim 4 in which said polymeric compound has a maximum elongation of 100%.

13. The pressure sensitive dry transfer graphics article of claim 12 in which said polymeric compound is an acrylic resin.

14. The pressure sensitive dry transfer graphics article of claim 12 in which said polymeric compound is a vinyl copolymer.

15. The pressure sensitive dry transfer graphics article of claim 12 in which said polymeric compound ranges from 0.01 oz/square yard to 0.1 oz/square yard of dry deposit.

16. The pressure sensitive dry transfer graphics article of claim 4 in which said pigmented pressure sensitive adhesive is acrylic in the range of 0.1 to 0.3 oz/square yard dry deposit.

* * * * *